United States Patent [19]

Matthewson et al.

[11] 4,427,117
[45] Jan. 24, 1984

[54] SIDE-LOADING CONTAINER CHASSIS STORAGE RACK

[75] Inventors: Randall W. Matthewson; Earl H. Benefiel; Ronald A. Brudi, all of Longview, Wash.

[73] Assignee: Brudi Equipment, Inc., Kelso, Wash.

[21] Appl. No.: 300,261

[22] Filed: Sep. 8, 1981

[51] Int. Cl.³ .............................................. A47F 7/00
[52] U.S. Cl. .................................... 211/13; 211/195; 296/3; 410/31
[58] Field of Search ..................... 211/60 S, 13, 60 R, 211/182, 192, 193, 195, 207; 410/31–48; 296/3; 248/544

[56] References Cited

U.S. PATENT DOCUMENTS

| | | | |
|---|---|---|---|
| 1,280,512 | 10/1918 | Macomber | 410/16 |
| 1,978,287 | 10/1934 | Thomas | 410/16 |
| 2,129,950 | 9/1938 | Loney | 410/43 |
| 2,449,491 | 9/1948 | Liebegott | 410/38 |
| 2,486,125 | 10/1949 | Cunnington | 410/40 |
| 2,567,328 | 9/1951 | Fahland | 410/43 |
| 3,184,207 | 5/1965 | Hermanns et al. | 211/182 X |
| 3,613,914 | 10/1971 | Jaekle et al. | 414/391 |
| 3,677,193 | 7/1972 | Pringle | 410/5 |
| 3,752,085 | 8/1973 | Venditty | 410/6 |
| 3,872,983 | 3/1975 | Chapman | 410/6 |
| 4,171,077 | 10/1979 | Richards, Jr. | 211/18 X |
| 4,319,791 | 3/1982 | Gibson | 248/544 X |

FOREIGN PATENT DOCUMENTS 466850 9/1928 Fed. Rep. of Germany ........ 211/17

OTHER PUBLICATIONS

4"×6" Color photograph of Multi-Sort, Inc., Portland, Oregon, container chassis rack, taken Jun. 1981.
Container News, May 1981, pp. 9, 10 and 17.

Primary Examiner—J. Franklin Foss
Assistant Examiner—David L. Talbott
Attorney, Agent, or Firm—Klarquist, Sparkman, Campbell, Leigh & Whinston

[57] ABSTRACT

A side-loading rack for storing wheeled container chassis in a nearly vertical, slightly leaning position has a framework of dividers defining plural vertical slots open on one side for receiving a container chassis sideways in each slot. Each divider includes a chassis support arm which extends front to rear along an upper side of each slot. Wheel supports are mounted on the dividers in a lower part of each slot so that the wheels of a container chassis stored in the slot rest on the wheel support and against one divider and the chassis frame leans at a small angle from vertical against the chassis support arm of an adjacent divider. Corner castings are positioned at opposite ends of the rack so that it can be handled in the same manner as a container. The dividers are constructed with an upper portion, including the chassis support arms, either removable from or collapsible into the lower portion of the frame means to form a more compact structure for ease of handling.

14 Claims, 6 Drawing Figures

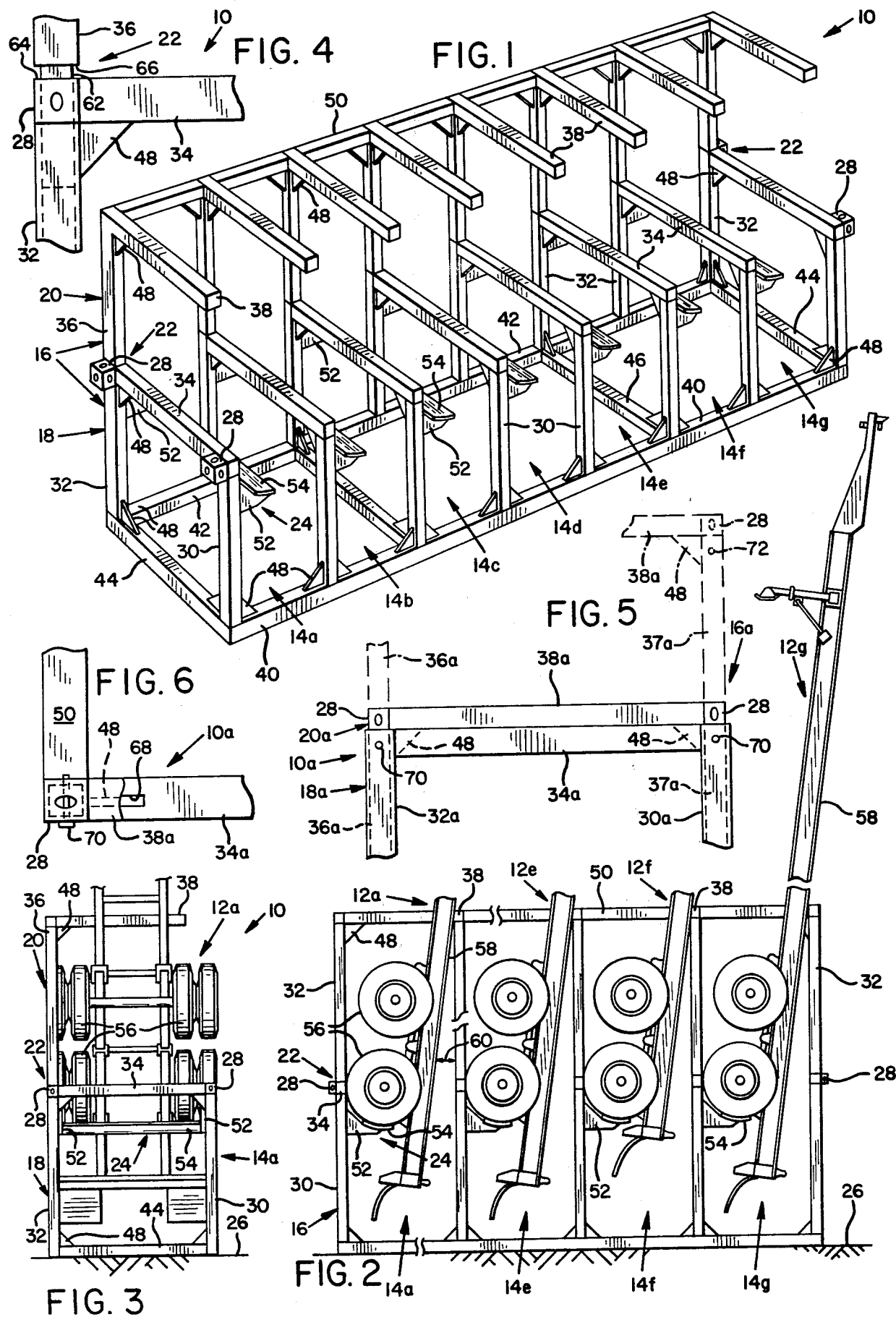

SIDE-LOADING CONTAINER CHASSIS STORAGE RACK

BACKGROUND OF THE INVENTION

This invention relates generally to structures for supporting vehicles and more particularly to racks for storing wheeled container chassis.

Container chassis are used to transport large truck-sized shipping containers. Such containers are used for packaging cargo for easy handling and transportation by ship, truck or rail. The containers are rectangular units which are typically 8 to 9.5 feet high and from 20 to 44 feet in length. Mounted on the upper and lower corners of the containers are ISO (International Standards Organization) corner castings. The containers are handled by lift trucks provided with hoisting attachments including twistlock devices adapted to engage the corner castings at opposite ends of the containers. Examples of such containers and lift trucks are disclosed on pages 9 and 17 in "Container News" of May 1981.

For transportation by truck, the containers are positioned on a wheeled container chassis, examples of which are disclosed on page 10 of the aforementioned magazine. The container is held in place by twist lock devices which protrude upwardly from the top of the chassis to engage the corner castings.

Since container chassis are very large, approximately 45 feet in length, their storage can be a problem. If much storage space is available, each chassis can be stored in a generally horizontal position with its wheels on the ground. However, this manner of storage is impractical in areas, such as seaports and railroad yards, where large numbers of the chassis accumulate and in which storage space is scarce.

In order to reduce the storage space requirements of container chassis, several methods of stacking have been devised. In one method, the container chassis are stacked horizontally one atop the other, with their wheels down. However, because stacking in this manner is unstable, only three chassis can be placed safely in a single stack. In an attempt to increase the number of chassis which can be stacked in a limited area, another stacking method calls for turning every other chassis in the stack upside down. In this way, as many as five chassis can be stacked safely. However, conventional methods of flipping the chassis upside down frequently damage the chassis. Moreover, both of the foregoing stacking methods cause uneven utilization of the stacked chassis. Because the first chassis in the stack is at the bottom of the stack and therefore less accessible, it is less likely to be used than the chassis at the top of the stack.

In an attempt to overcome some of the deficiencies of the foregooing stacking methods, Multi-Sort, Inc. of Portland, Oreg., devised a rack for stacking container chassis in an approximately vertical position. In top plan view, this rack has a generally U-shape with an opening at one end of the rack. A series of horizontally pivoting arms are mounted along one side of the rack and at the top thereof. A container chassis is positioned in the rack by hoisting it into a vertical position with a lift truck and moving it wheels first into the open end of the rack. The chassis is then placed in the rack with its rear end resting on the ground and the underside of its frame resting against the closed end of the rack. The first pivot axis is then swung across the rack and latched into position so that another container chassis can be leaned against it.

This method of storage reduces the storage area required by the container chassis, but has several drawbacks. First, like the aforementioned ground stacking systems, this rack provides a first in, last out storage system, resulting in uneven utilization of the chassis. Second, it requires a special lift truck attachment designed so that the lift truck approaches an empty chassis from its rear end. The attachment is tilted down to grasp the chassis along opposite sides of its frame and then tilted back up to lift the chassis into an upright position. A third disadvantage of this rack is the difficulty in storing the container chassis off the ground. The rear end of the chassis frame is provided with rear taillights and other breakable parts. If the chassis is stood on its rear end, these parts are susceptible to damage. The chassis wheels can be rested on wheel chocks, but the chocks must be removed from the empty storage positions in order to provide free access for the lift truck into the rack. Finally, efficient use of this rack requires two people, one to operate the lift truck and the other to manipulate the wheel chocks and horizontally-pivoting arms. Otherwise, the operator of the lift truck must get off the lift truck to perform these steps each time a chassis is placed in or removed from the rack.

It would be preferable to be able to stack the container chassis so that the first chassis stored can be the first chassis removed from storage for use, thereby enabling more uniform utilization of all the stored chassis. It would also be preferable to be able to handle empty container chassis by means of lift truck apparatus adapted for approaching and engaging the chassis along one side so that the need for special chassis-handling apparatus is minimized. Ideally, the stacking system should also require only one person to perform all steps in the storage process from the seat of a lift truck.

A variety of storage systems for automobiles are known. U.S. Pat. Nos. 1,280,512 to Macomber and 1,978,287 to Thomas disclose frame structures inclined at 20°–40° angles for supporting automobiles in a railroad car. To prevent rolling, the wheels of the automobiles are secured in a cradle by chains. U.S. Pat. No. 3,677,193 to Pringle discloses a railroad car in which automobiles are stored on their side, supported along a wall by brackets connected to the underside of their chassis. U.S. Pat. Nos. 3,613,914 to Jaekle, et al.; 3,752,085 to Venditty and 3,872,983 to Chapman disclose railroad cars designed to support automobiles on end, supported on tiltable sidewalls of the freight cars by brackets connected to the underside of the chassis of the automobiles.

However, none of the foregoing patents discloses means for solving the above-described problems connected with the storage of wheeled container chassis. In particular, none of these patents discloses a storage apparatus into which a container chassis could be loaded sideways. Nor do they disclose means for supporting a container chassis vertically above ground level without positive securement.

Accordingly, there remains a need for an improved arrangement for storing wheeled container chassis.

SUMMARY OF THE INVENTION

One object of the invention is to provide an improved storage arrangement for wheeled container chassis.

A second object is to enable container chassis to be stored in a vertical position above the ground without positive securement.

A third object is to store multiple container chassis so that they can be used in a first-in, first-out or any other desired sequence.

Another object of the invention is to enable a single person to store container chassis without assistance and without risk of damage to the container chassis.

A further object is to minimize the area required for storage of container chassis.

Yet another object is to store container chassis in a way that is compatible with the machinery customarily used for handling containers and container chassis.

To meet the foregoing objects, the invention provides for a side-loading rack for storing wheeled container chassis in a nearly vertical, slightly leaning position. The rack has structural or frame means defining plural vertical slots or stalls open on one side for receiving a container chassis sideways in each slot. A chassis support extends front to rear along an upper side of each slot for supporting the container chassis frame. A wheel support means is positioned on the frame means in a lower part of the slot so that a container chassis is supported therein with its wheels resting on the wheel support means on one side of the slot and the upper side of its frame leaning against the chassis support on the other side of the slot, preferably at a small angle from vertical.

The rack is preferably constructed so that it can be handled in the same manner as a container, using conventional container-handling apparatus. Accordingly, corner castings are positioned at opposite ends of the rack. The frame means can be constructed with an upper portion, including the chassis support arms, either removable from or collapsible into the lower portion of the frame means to form a more compact structure for easy handling.

The foregoing and other objects, features and advantages of the invention will become more apparent from the following detailed description of a preferred embodiment of the invention, which proceeds with reference to the accompanying drawing.

BRIEF DESCRIPTION OF THE DRAWING

FIG. 1 is a perspective view of a side-loading container chassis storage rack in accordance with the invention.

FIG. 2 is a front elevational view of end portions of the rack of FIG. 1 with a container chassis standing in each slot of the rack.

FIG. 3 is a side elevational view of the left end of the rack of FIGS. 1 and 2.

FIG. 4 is an enlargement of a portion of the view of FIG. 3 showing one mode of interconnection of the upper and lower portions of the rack.

FIG. 5 is an enlarged side elevational view of the left end of an alternate embodiment of a rack in accordance with the invention showing the upper portion of the rack telescoped into the lower portion in solid lines and raised in phantom lines.

FIG. 6 is a top plan view of a corner portion of the rack of FIG. 5.

DETAILED DESCRIPTION OF PREFERRED EMBODIMENTS

Embodiment of FIGS. 1-4

Referring to FIGS. 1-3, a side-loading rack 10 for storing a number of wheeled container chassis 12 in narrow, relatively tall separate slots or stalls 14 comprises structural frame means defining a series of laterally spaced-apart dividers 16. The frame means is constructed of suitable structural members, such as steel square or rectangular tubular members, welded together at their joints. Each of the dividers has a lower portion 18 and an upper portion 20 joined by interconnection means 22. A wheel support means 24 for supporting a chassis by its rear wheels is mounted on the lower portion of each divider on one side of the slot at a position spaced above the ground 26. Pairs of ISO corner castings 28 are mounted on the upper corners of the lower portions of the dividers at each end of the rack. When the upper portions of the dividers are removed or collapsed into the lower portions, as further described hereinafter, the corner castings enable the empty storage rack to be handled and transported in the same manner as a container.

By using eight dividers 16, seven storage slots 14 are created in the ground space that would otherwise be occupied by a single container chassis in a horizontal position. Longer or shorter racks may be used. However, for convenience in handling with conventional container-handling equipment, a rack of seven slots is preferred.

The lower portion of each divider 16 comprises parallel front and rear upright members 30, 32 interconnected at their upper ends by a horizontal member 34. The aforementioned corner castings are mounted along the outer ends of the rack at the corners formed by members 30, 34 and 32, 34 respectively. The upper portion of each divider is an inverted L-shaped member which comprises an upright member 36 connected by the interconnection means 22 as an upward extension of member 32 and supporting a cantilevered support arm 38 which extends forwardly above member 34 in spaced-apart parallel relationship.

A pair of spaced-apart, parallel, horizontal foundation members 40, 42 extend along the front and rear sides of the rack to interconnect the lower ends of upright members 30, 32, respectively. A pair of end foundation members 44 interconnect the ends of the front and rear foundation members and the lower ends of upright members 30, 32 at each end of the rack. Two additional cross members 46 extend at intervals between the front and rear foundation members parallel to end members 44. Triangular gussets 48 are secured in the corners between the various vertical and horizontal members to rigidify the rack and to support the cantilevered support arms 38. Horizontal cross members 50 interconnect the upper ends of upright members 36.

Each wheel support 24 comprises a pair of generally triangular support members 52 connected to the upright members 30, 32 so as to protrude from left to right, as viewed in FIGS. 1 and 2, part way into each slot. Secured to the upper sides of triangular support members and extending horizontally therebetween, is an elongated wheel support plate 54. Its upper side is concavely curved about an axis extending from front to rear in the rack for cradling the rearmost wheels 56 of a container chassis resting thereon. The wheel supports 24 are positioned far enough above the ground so that container chassis with elongated rear ends of varying lengths do not contact the ground. They are also spaced below and extend to the right of the horizontal members 34 to which they are connected so that wheels 56 abut such members along a horizontal line passing approximately through the axles of the wheels. The horizontal members thereby limit how far the wheels can roll toward the left.

The upper surface of the container chassis frame 58 leans against the left side of the upper support arm 38. The upper support arm is positioned diagonally across the storage slot from the wheel support means so that frame 58 leans at a small angle 60 from the vertical. Angle 60 is preferably less than about 10° so that most of the weight of the chassis rests on the wheel support means, but great enough so that a leftward horizontal force component acting on wheel support 24 prevents wheels 56 from rolling off the support.

Referring to FIG. 4, connection means 22 is provided by a downward extension 62 of member 36 sized to slide inside member 32, which has a complementary opening 64 in its upper end. Upright members 32, 36 preferably have the same width. Accordingly, the lower end of member 36 forms a shoulder 66 which abuts the top of member 32 when extension 62 is inserted to its full length in member 32.

In one example, a storage rack 10, dimensioned for storing up to seven container chassis of approximately 45 feet in length, is 40 feet long. The upper surfaces of the upper support arms 38 are 16 feet off the ground. The upper surface of plate member 54 of the wheel support means are about 6 feet off the ground and the upper surface of the horizontal members 34 is about 8 feet off the ground. The width of each slot is approximately 5 feet. These dimensions yield a preferred angle 60 of about 8°.

Embodiment of FIGS. 5-6

Referring to FIG. 5, in an alternative embodiment of rack 10a the connection means is arranged so that the upper portions 20a of the dividers 16a telescope into the lower portions 18a. In this embodiment, upper vertical member 36a is sized along its entire length to fit inside member 32a. A second upper vertical member 37a is connected to the front end of support arm 38a and is likewise sized to telescope into member 30a. The corner castings 28 are mounted within the corners between members 36a, 38a and 37a, 38a of the upper portion of the endmost dividers, rather than on the outer sides of the lower portion of the endmost dividers. Slots 68 are provided in the upper surface of each member 34a in position to allow the triangular gussets members 48 to extend downwardly inside members 34a when the upper portion of the dividers are lowered to rest on the lower portions.

Pins 70 extend horizontally through the upper ends of members 30a, 32a and through complementary holes in members 36a, 37a at two alternative vertical locations. The uppermost holes 72 are located near the upper ends of members 36a, 37a so that pin 70 will extend therethrough when the upper portions of the dividers are lowered into the lower portions. The pins can thus lock the upper portions in a lowered position so that the entire rack can be picked up by a container-handling device engaging the corner castings. The lower holes (not shown) are positioned just above the lower ends of members 36a, 37a so that pins 70 can extend therethrough to secure the upper portions of the dividers in a vertically-extended position when the rack is to be used for storing container chassis.

OPERATION

Racks 10, 10a are transported in a collapsed condition, that is, with the upper portions of the dividers either removed from or telescoped into the lower portions. For conventional truck and rail transportation, the overall height of the collapsed rack should be less than 9.5 feet. At its destination, each rack is moved around by conventional container-handling apparatus. When positioned for use to store the container chassis, the right end of the rack should be about 5 feet away from any tall wall or building. Of course, multiple racks can be placed in end-to-end or back-to-back abutting relationship.

Rack 10 is assembled by inserting the extensions 62 of members 36 into members 32. Rack 10a is assembled by removing pins 70, raising the upper portions 20a using the container handling apparatus, and reinserting the pins in the lower holes in members 36a, 37a.

To store a container chassis in either rack, the chassis is lifted from the ground and rotated from horizontal to an approximately vertical position, with its rear wheels at least as high as the wheel support means 24. This operation is performed by a rotating attachment on a lift truck which grasps the chassis from one side. The container chassis is then moved sideways in a direction from front to rear in the rack into one of the empty storage slots. When the rear wheels 56 of the chassis are vertically aligned with the wheel support means, the chassis is gently lowered until its rearmost wheels rest on the wheel support plate 54. Once the wheels contact the wheel support plate, the chassis frame 58 is tilted backwards, pivoting on the rear wheels, to lean gently against the associated support arm 38. To remove a chassis from the rack, the foregoing steps are reversed.

Having illustrated and described two preferred embodiments of our invention, and the operation thereof, those skilled in the art should appreciate that the invention can be modified in arrangement and detail witout departing from it. Accordingly, we claim all modifications and variations coming within the spirit and scope of the following claims.

We claim:
1. A side-loading rack for storing wheeled container chassis having an elongated chassis frame projecting forwardly from rear, ground-engaging wheels, the rack comprising:
   rack frame means defining a plurality of stalls, including first and second upright frame means spaced laterally apart to define a side of each stall and to form an opening on one side of the rack for receiving a container chassis sideways in a generally vertical orientation;
   a first chassis support means at one side of each stall for supporting the rear wheels of the chassis on the first frame means above ground level; and
   a second chassis support means at the opposite side of each stall and at a level spaced above the first support means for supporting a forwardly-projecting portion of the container chassis frame in a generally upright position with the wheels of the chassis supported against the first support means.
2. A rack according to claim 1 in which the structural means includes a lower portion, an upper portion and means for interconnecting the upper and lower portions so that the rack can be partially disassembled for transportation.

3. A rack according to claim 2 in which each upper portion is sized for removable insertion a short distance into the lower portion to define said interconnecting means and to enable removal of the upper portions from the lower portions.

4. A rack according to claim 3 in which said lower portions at the ends of the rack each comprise a pair of spaced-apart parallel frame members with engaging means at their upper ends for engagement by a container pick-up apparatus.

5. A rack according to claim 2 in which the upper portions are sized for telescoping into the lower portions to define said interconnecting means and to enable collapsing the upper portions into the lower portions.

6. A rack according to claim 5 in which said upper portions at the ends of the rack include engaging means for engagement by a container pick-up apparatus and means for locking the upper portions in a position collapsed into the lower portions.

7. A rack according to claim 1 in which the chassis frame support means comprise parallel horizontal members cantilevered on upper portions of the structural means.

8. A rack according to claim 1 in which the wheel support means is vertically positioned so that a lower end of the frame of the container chassis is spaced above ground level and horizontally positioned so that the treads of the chassis wheels rest thereon and abut a side of the upright member.

9. A side-loading container chassis storage rack comprising:
   first upright frame means extending above a ground level;
   second upright frame means extending above the first frame means and spaced laterally apart therefrom;
   wheel support means connected to the first upright frame means at a position above ground level for supporting a wheeled container chassis by its rear wheels between the first and second frame means and with its rear end above ground level; and
   a support arm connected to the second upright frame means above the wheel support means for supporting the container chassis in a generally upright position with the upper side of its frame leaning at a small angle against the support arm.

10. A method of supporting for storage a wheeled container chassis having an elongated chassis frame projecting forwardly from rear, ground-engaging chassis wheels, the method comprising:
    orienting the chassis in a generally vertical attitude with its frame projecting upwardly;
    inserting the chassis sideways into a storage stall;
    supporting the rearmost wheels of the chassis on a wheel support means at one side of the stall; and
    leaning an upwardly-projecting portion of the chassis frame against a chassis frame support at the opposite side of the stall and at a level above the wheel support means.

11. A side-loading rack for vertically storing container chassis having a chassis frame and rear wheels, the rack comprising:
    plural upright frame means spaced laterally apart to define at least two parallel vertical chassis storage slots therebetween along the length of the rack;
    first chassis support means disposed in a lower portion of each slot for supporting a rear portion of the chassis against one of said frame means on one side of the slot;
    means defining an entry into each slot along a longitudinal side of the rack, the entry being sized so that the chassis frame, oriented generally vertically, can be moved sideways through the entry into the slot and lowered onto the first chassis support means; and
    second chassis support means including a cross arm connected to each frame means and extending generally horizontally along an opposite side of each slot at a level above the first chassis support means for supporting an upwardly-projecting portion of the chassis frame in a generally upright position against a second of said frame means;
    the upright frame means being laterally spaced so that each chassis leans against the second support means at a small angle from vertical.

12. A rack according to claim 11 including a wheel support means on the opposite side of each storage slot from the chassis frame support means for resting the rearmost wheels of the container chassis thereon,
    the wheel support means being positioned vertically along the divider means so as to provide vertical clearance below the rear end of the chassis frame; and
    the divider means being spaced apart a distance such that the chassis frame leaning against the chassis frame support means exerts a horizontal component of force at the level of the wheels against the divider means on said opposite side to retain the wheels on said wheel support means without positive securement.

13. A rack according to claim 1 in which the first chassis support means includes means defining an upright support surface in the frame means for providing a first lateral force component against the wheels, the second chassis support means providing a second lateral force component against the chassis opposing the first lateral force component so as to maintain the chassis generally upright without positive securement.

14. A method of supporting for storage a wheeled container chassis having an elongated chassis frame having laterally spaced longitudinal side frame members forwardly of rear ground-engaging chassis wheels including a pair of rearmost wheels coaxially mounted on a lower side of the laterally spaced longitudinal side frame members of the chassis, the method comprising:
    orienting the chassis in a generally vertical attitude with its frame projecting upwardly from the wheels;
    exerting a first supporting force radially against the rearmost wheels of the chassis; and
    exerting a second supporting force against an upper surface of the laterally spaced longitudinal side frame members of the chassis forwardly of the rearmost wheels at a level above the point of application of the first supporting force, said second force being applied in a direction so as to maintain said generally vertical attitude without positive securement.

* * * * *